(12) United States Patent
Chae et al.

(10) Patent No.: US 11,359,040 B2
(45) Date of Patent: Jun. 14, 2022

(54) POLYOLEFIN CATALYST AND METHOD FOR PREPARING POLYOLEFIN BY USING SAME

(71) Applicant: LOTTE CHEMICAL CORPORATION, Seoul (KR)

(72) Inventors: Byung Hun Chae, Daejeon (KR); Joon Keun Min, Daejeon (KR); Sung Won Jung, Seoul (KR); Youn Jin Hong, Daejeon (KR); Hyun Yul Woo, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 189 days.

(21) Appl. No.: 16/463,325

(22) PCT Filed: Sep. 27, 2017

(86) PCT No.: PCT/KR2017/010745
§ 371 (c)(1),
(2) Date: May 22, 2019

(87) PCT Pub. No.: WO2018/097468
PCT Pub. Date: May 31, 2018

(65) Prior Publication Data
US 2019/0270833 A1  Sep. 5, 2019

(30) Foreign Application Priority Data

Nov. 23, 2016  (KR) .................. 10-2016-0156361
Jun. 12, 2017  (KR) .................. 10-2017-0073297

(51) Int. Cl.
| | |
|---|---|
| *C07F 17/00* | (2006.01) |
| *C08F 4/6592* | (2006.01) |
| *C08F 210/16* | (2006.01) |
| *C08F 2/38* | (2006.01) |
| *C08F 4/642* | (2006.01) |
| *C07F 19/00* | (2006.01) |
| *C08F 4/659* | (2006.01) |
| *C08F 4/14* | (2006.01) |

(52) U.S. Cl.
CPC ............ *C08F 210/16* (2013.01); *C07F 17/00* (2013.01); *C07F 19/00* (2013.01); *C08F 2/38* (2013.01); *C08F 4/14* (2013.01); *C08F 4/642* (2013.01); *C08F 4/659* (2013.01); *C08F 4/6592* (2013.01); *C08F 2420/01* (2013.01)

(58) Field of Classification Search
CPC ............................. C07F 17/00; C08F 4/65927
See application file for complete search history.

(56) References Cited

U.S. PATENT DOCUMENTS

| | | | |
|---|---|---|---|
| 7,226,886 B2 | 6/2007 | Jayaratne et al. | |
| 9,266,910 B2 | 2/2016 | McCullough | |
| 2014/0194277 A1* | 7/2014 | Ishihama | C08J 5/18 502/117 |
| 2015/0119539 A1 | 4/2015 | McCullough | |

FOREIGN PATENT DOCUMENTS

| | | |
|---|---|---|
| EP | 0416815 B1 | 3/1991 |
| EP | 0420436 B1 | 8/1996 |
| EP | 0842939 B1 | 5/1998 |
| EP | 3441407 A1 | 2/2019 |
| EP | 3450467 A1 | 3/2019 |
| JP | H09-087314 A | 3/1997 |

(Continued)

OTHER PUBLICATIONS

Extended European Search Report issued in corresponding EP Application No. 17873761.5 dated May 27, 2020 (8 pages).
International Search Report issued in International Application No. PCT/KR2017/010745 dated Jan. 11, 2018 (2 pages).
Written Opinion issued in International Application No. PCT/KR2017/010745 dated Jan. 11, 2018 (6 pages).

*Primary Examiner* — Caixia Lu
(74) *Attorney, Agent, or Firm* — Osha Bergman Watanabe & Burton LLP

(57) ABSTRACT

Disclosed are a polyolefin having a high molecular weight by using a novel metallocene catalyst; a method for preparing the polyolefin by using the same; and a method for preparing an ethylene-propylene random copolymer having high molecular weight, high syndiotacticity and small crystal size, thereby providing injection molded articles with improved transparency. The present invention provides a transition metal compound represented by chemical formula 1:

6 Claims, No Drawings

(56) References Cited

FOREIGN PATENT DOCUMENTS

| | | | |
|---|---|---|---|
| JP | 2015-172037 A | | 10/2015 |
| JP | 2016-145190 | * | 8/2016 |
| JP | 2016-145190 A | | 8/2016 |
| JP | 2016-172714 A | | 9/2016 |
| KR | 20140133343 A | | 11/2014 |
| KR | 20150029368 A | | 3/2015 |
| WO | 2015-065681 A1 | | 5/2015 |

* cited by examiner

POLYOLEFIN CATALYST AND METHOD FOR PREPARING POLYOLEFIN BY USING SAME

TECHNICAL FIELD

The present invention relates to a polyolefin catalyst and a method for preparing a polyolefin by using same, and more particularly, to a method for preparing a polyolefin having a high molecular weight by using a metallocene catalyst, and a method for preparing an ethylene-propylene random copolymer having a high molecular weight and ethylene syndiotactic index and having a small crystal size, thereby having improved transparency during injection.

BACKGROUND ART

Conventionally, for the preparation of an olefin polymer, generally, a so-called Ziegler-Natta catalyst composed of a main catalyst component of a titanium or vanadium compound and a co-catalyst component of an alkylaluminum compound has been used. However, the Ziegler-Natta catalyst system is a multi-active site catalyst in which a number of active species are mixed, and a polymer is characterized in showing broad molecular weight distribution. However, the composition distribution of a comonomer is not uniform, and there is limitation in the confirmation of desired physical properties.

A metallocene catalyst system composed of a metallocene compound of a transition metal of group 4 in the periodic table, such as titanium, zirconium and hafnium and a methylaluminoxane co-catalyst, is a homogeneous catalyst having a catalyst active site of a single species, and shows narrower molecular weight distribution of a polymer when compared with the conventional Ziegler-Natta catalyst system and uniform composition distribution of a comonomer and has the feature of changing the properties of a polymer according to the conformation change of a ligand in a catalyst.

Meanwhile, the metallocene catalyst is more expensive than the conventional Ziegler-Natta catalyst but has high activity and an economic value, and particularly has good reactivity with respect to a comonomer, and thus, a polymer containing a large amount of the comonomer with high activity may be obtained even though a small amount of the comonomer is injected. Since a polymer having more uniform composition distribution and a high molecular weight may be prepared even though the same amount of the comonomer is used, the application thereof as a film or elastomer having good physical properties may be possible by using the same. In addition, a wax-type extract having a low molecular weight is rarely produced in the copolymer, and application in sanitary use such as in medical need is possible.

Generally, a bridged catalyst, that is, an ansa-metallocene compound which is a transition metal compound including two ligands connected via a bridge group is known to have good reactivity with respect to a comonomer, and is used as a catalyst for preparing an olefin-based homopolymer or copolymer. Particularly, it is known that an ansa-metallocene compound including a cyclopentadienyl-fluorenyl ligand may produce a polyethylene having a high molecular weight, and through this, the microstructure of a polypropylene may be controlled.

Although such a catalyst has been developed, the preparation of a more effective catalyst, particularly a catalyst having a high molecular weight as a catalyst showing more improved polymerization performance, and the development of a method for polymerizing an olefin using such a catalyst are required in the art.

On the other hand, if a generally used bisindenyl-based metallocene catalyst having a C2 symmetry structure is used, advantage of obtaining 95% or more isotacticity is achieved but copolymerization degree with ethylene is reduced and thus, activity is decreased. In addition, in case of a metallocene catalyst with the conventional asymmetry structure (U.S. Pat. No. 9,266,910), there are demerits of obtaining a polypropylene having a small molecular weight, and though the copolymerization degree is improved while copolymerizing with ethylene, there are demerits of further more reducing molecular weight. That is, the application to a polypropylene product having a low melt index (MI) using the metallocene catalyst having the conventional asymmetry structure, is inappropriate.

PRIOR ART DOCUMENTS

Korean Laid-open Patent No. 2015-0029368 (Mar. 18, 2015)
Korean Laid-open Patent No. 2014-0133343 (Nov. 19, 2014)
U.S. Pat. No. 7,226,886 (Jun. 5, 2007)
U.S. Pat. No. 9,266,910 (Feb. 23, 2016)
European Patent No. 0416815 (Mar. 13, 1991)
European Patent No. 0420436 (Apr. 3, 1991)
European Patent No. 0842939 (May 20, 1998)

DISCLOSURE OF THE INVENTION

Technical Problem

The present invention is devised to solve the above-described problems, and provides a catalyst having a high molecular weight by using a novel metallocene catalyst, a method for preparing a polyolefin by using same, and a method for preparing an ethylene-propylene random copolymer having a high molecular weight, improved transparency during injection, and an excellent copolymerization degree with ethylene.

Technical Solution

In order to solve the above-mentioned tasks, the present invention provides a transition metal compound represented by chemical formula 1 below.

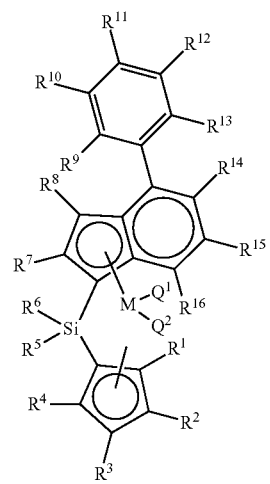

[Chemical formula 1]

In chemical formula 1, M is a transition metal of group 4, $Q^1$ and $Q^2$ are each independently halogen, $(C_1\text{-}C_{20})$alkyl, $(C_2\text{-}C_{20})$alkenyl, $(C_2\text{-}C_{20})$alkynyl, $(C_6\text{-}C_{20})$aryl, $(C_1\text{-}C_{20})$alkyl $(C_6\text{-}C_{20})$aryl, $(C_6\text{-}C_{20})$aryl $(C_1\text{-}C_{20})$alkyl, $(C_1\text{-}C_{20})$alkylamido, $(C_6\text{-}C_{20})$arylamido or $(C_1\text{-}C_{20})$alkylidene; $R^1$, $R^2$, $R^3$ and $R^4$ are each independently hydrogen; $(C_1\text{-}C_{20})$alkyl including or not including acetal, ketal or an ether group; $(C_2\text{-}C_{20})$alkenyl including or not including acetal, ketal or an ether group; $(C_1\text{-}C_{20})$alkyl $(C_6\text{-}C_{20})$aryl including or not including acetal, ketal or an ether group; $(C_6\text{-}C_{20})$aryl $(C_1\text{-}C_{20})$alkyl including or not including acetal, ketal or an ether group; or $(C_1\text{-}C_{20})$silyl including or not including acetal, ketal or an ether group; two or more among $R^1$, $R^2$, $R^3$ and $R^4$ may be connected with each other to form an aliphatic ring or an aromatic ring; $R^5$, $R^6$, $R^7$ and $R^8$ are each independently hydrogen; $(C_1\text{-}C_{20})$alkyl including or not including acetal, ketal or an ether group; $(C_2\text{-}C_{20})$alkenyl including or not including acetal, ketal or an ether group; $(C_1\text{-}C_{20})$alkyl$(C_6\text{-}C_{20})$aryl including or not including acetal, ketal or an ether group; $R^9$, $R^{10}$, $R^{11}$, $R^{12}$, $R^{13}$, $R^{14}$, $R^{15}$ and $R^{16}$ are each independently hydrogen; $(C_1\text{-}C_{20})$alkyl including or not including acetal, ketal or an ether group; $(C_2\text{-}C_{20})$alkenyl including or not including acetal, ketal or an ether group; $(C_1\text{-}C_{20})$alkyl$(C_6\text{-}C_{20})$aryl including or not including acetal, ketal or an ether group; $(C_6\text{-}C_{20})$aryl$(C_1\text{-}C_{20})$alkyl including or not including acetal, ketal or an ether group; or $(C_1\text{-}C_{20})$silyl including or not including acetal, ketal or an ether group; two or more among $R^9$, $R^{10}$, $R^{11}$, $R^{12}$, $R^{13}$, $R^{14}$, $R^{15}$ and $R^{16}$ may be connected with each other to form an aliphatic ring or an aromatic ring.

In addition, there is provided a transition metal compound characterized in that at least one or more among $R^1$, $R^2$, $R^3$ and $R^4$ are hydrogen, and the rest thereof may be each independently substituted with $(C_1\text{-}C_{20})$alkyl, $(C_2\text{-}C_{20})$alkenyl, $(C_6\text{-}C_{20})$aryl, or $(C_1\text{-}C_{20})$silyl including or not including acetal, ketal or an ether group; and two or more among $R^1$, $R^2$, $R^3$ and $R^4$ may be connected with each other to form an aliphatic ring or an aromatic ring.

In addition, there is provided a transition metal compound characterized in that at least one or more among $R^1$, $R^2$, $R^3$ and $R^4$ are hydrogen, and the rest thereof are each independently substituted with $(C_1\text{-}C_{20})$alkyl.

In addition, there is provided a transition metal compound characterized in that at least two or more among $R^1$, $R^2$, $R^3$ and $R^4$ are hydrogen, and the rest thereof may be each independently substituted with $(C_1\text{-}C_{20})$alkyl, $(C_2\text{-}C_{20})$alkenyl, $(C_6\text{-}C_{20})$aryl, or $(C_1\text{-}C_{20})$silyl including or not including acetal, ketal or an ether group; and two or more among $R^1$, $R^2$, $R^3$ and $R^4$ may be connected with each other to form an aliphatic ring or an aromatic ring.

In addition, there is provided a transition metal compound characterized in that at least two or more among $R^1$, $R^2$, $R^3$ and $R^4$ are hydrogen, and the rest thereof are each independently substituted with $(C_1\text{-}C_{20})$alkyl.

In addition, there is provided a transition metal catalyst composition including: the transition metal compound; and one or more co-catalyst compounds selected from the group consisting of an aluminum compound represented by chemical formula 2 below, an alkyl metal compound represented by chemical formula 3 below, and a boron compound represented by chemical formula 4 below.

  [Chemical formula 2]

In chemical formula 2, $R^{17}$ is a halogen radical, or a hydrocarbyl radical of 1 to 20 carbon atoms, which is substituted or unsubstituted with halogen; and n is an integer of 2 or more.

  [Chemical formula 3]

In chemical formula 3, A is aluminum or boron; $R^{18}$ groups are the same or different, and are each independently a halogen radical, or a hydrocarbyl radical of 1 to 20 carbon atoms, which is substituted or unsubstituted with halogen.

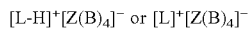  [Chemical formula 4]

In chemical formula 4, L is a neutral or cationic Lewis acid; H is a hydrogen atom;

Z is an element of group 13; B is each independently an aryl or alkyl radical of 6 to 20 carbon atoms, of which one or more hydrogen atoms are substituted with halogen, hydrocarbyl of 1 to 20 carbon atoms, alkoxy or a phenoxy radicals.

In addition, there is provided a transition metal catalyst composition characterized in that the aluminum compound co-catalyst is one selected from an alkylaluminoxane or an organic aluminum or a mixture of two or more thereof, and is a single one selected among methylaluminoxane, modified methylaluminoxane, tetraisobutylaluminoxane, trimethylaluminum, triethylaluminum, triisobutylaluminum and trioctylaluminum, or a mixture of two or more thereof, and the boron compound co-catalyst is a single one selected among tris(pentafluorophenyl)borane, N,N-dimethylanilinium tetrakis(pentafluorophenyl)borate and triphenylmethylinium tetrakis(pentafluorophenyl)borate, or a mixture thereof.

In order to solve another task, the present invention provides a method for preparing a polyolefin, including a step of polymerizing propylene or ethylene in the presence of the transition metal catalyst composition.

In order to solve another task, the present invention provides a method for preparing an ethylene-propylene random copolymer which has an ethylene syndiotactic index of 0.91 or more, a melting point of 147° C. or less, a weight average molecular weight of 200,000-1,000,000, molecular weight distribution (Mw/Mn) of 2.0-5.0, a melt index (230° C., 2.16 kg load) of 0.5-10.0 g/10 min, and a haze of 10-25, wherein the method includes a step of polymerizing propylene and ethylene in the presence of the transition metal catalyst composition.

In addition, there is provided a method for preparing an ethylene-propylene random copolymer characterized in that the ethylene is added in 0.5 to 5 parts by weight with respect to 100 parts by weight of the propylene and polymerized in the step of polymerizing ethylene and propylene.

Advantageous Effects

The novel metallocene catalyst according to the present invention enables the production of a polyolefin having better activity and higher molecular weight when compared with the conventional catalyst. In addition, the production of a polypropylene resin having a high molecular weight and a low melt index (MI), is possible, and particularly, the preparation of an ethylene-propylene random copolymer having high ethylene syndiotactic index and a small crystal size, thereby having improved transparency during injection, is possible.

MODE FOR CARRYING OUT THE INVENTION

Hereinafter, preferred embodiments of the present invention will be described in detail. In explaining the present invention, if particular explanation on relevant prior art is considered to obscure the gist of the present invention, detailed explanation thereof will be omitted. Through the disclosure, a part is referred to "include" a constituent element, the part does not exclude other constituent elements but may further include other constituent elements unless otherwise indicated.

The present invention provides a transition metal compound represented by chemical formula 1 below.

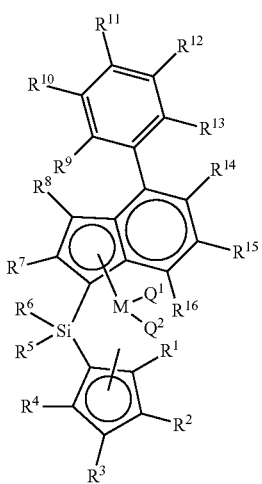

[Chemical formula 1]

In chemical formula 1, M is a transition metal of group 4, $Q^1$ and $Q^2$ are each independently halogen, $(C_1-C_{20})$alkyl, $(C_2-C_{20})$alkenyl, $(C_2-C_{20})$alkynyl, $(C_6-C_{20})$aryl, $(C_1-C_{20})$alkyl $(C_6-C_{20})$aryl, $(C_6-C_{20})$aryl $(C_1-C_{20})$alkyl, $(C_1-C_{20})$alkylamido, $(C_6-C_{20})$arylamido or $(C_1-C_{20})$alkylidene; $R^1$, $R^2$, $R^3$ and $R^4$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl $(C_6-C_{20})$aryl including or not including acetal, ketal or an ether group; $(C_6-C_{20})$aryl $(C_1-C_{20})$alkyl including or not including acetal, ketal or an ether group; or $(C_1-C_{20})$silyl including or not including acetal, ketal or an ether group; two or more among $R^1$, $R^2$, $R^3$ and $R^4$ may be connected with each other to form an aliphatic ring or an aromatic ring; $R^5$, $R^6$, $R^7$ and $R^8$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl$(C_6-C_{20})$aryl including or not including acetal, ketal or an ether group; $R^9$, $R^{10}$, $R^{11}$, $R^{12}$, $R^{13}$, $R^{14}$, $R^{15}$ and $R^{16}$ are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl$(C_6-C_{20})$aryl including or not including acetal, ketal or an ether group; $(C_6-C_{20})$aryl$(C_1-C_{20})$alkyl including or not including acetal, ketal or an ether group; or $(C_1-C_{20})$silyl including or not including acetal, ketal or an ether group; two or more among $R^9$, $R^{10}$, $R^{11}$, $R^{12}$, $R^{13}$, $R^{14}$, $R^{15}$ and $R^{16}$ may be connected with each other to form an aliphatic ring or an aromatic ring.

The term "alkyl" described in the present invention means monovalent a linear or branched chain saturated hydrocarbon radical composed of only carbon and hydrogen atoms, and examples of such alkyl radical include methyl, ethyl, propyl, isopropyl, butyl, isobutyl, t-butyl, pentyl, hexyl, octyl, dodecyl, etc., without limitation.

In addition, the term "cycloalkyl" described in the present invention means a monovalent aliphatic alkyl radical composed of one ring, and examples of the cycloalkyl include cyclopropyl, cyclobutyl, cyclopentyl, cyclohexyl, cycloheptyl, cyclooctyl, cyclononyl, cyclodecyl, etc., without limitation.

In addition, the term "alkenyl" described in the present invention means a linear or branched chain hydrocarbon radical including one or more carbon-carbon double bonds, and includes ethenyl, propenyl, butenyl, pentenyl, etc., without limitation.

The term "aryl" described in the present invention is an organic radical derived from an aromatic hydrocarbon by the removal of one hydrogen atom and includes a single or fused ring system. Particular examples include phenyl, naphthyl, biphenyl, anthryl, fluorenyl, phenanthryl, triphenylenyl, pyrenyl, perylenyl, chrysenyl, naphthacenyl, fluoranthenyl, etc., without limitation.

The term "alkoxy" described in the present invention means a —O-alkyl radical, where "alkyl" is the same as defined above. Examples of such alkoxy radical include methoxy, ethoxy, isopropoxy, butoxy, isobutoxy, t-butoxy, etc., without limitation.

In addition, the term "halogen" described in the present invention means a fluorine, chlorine, bromine or iodine atom.

In the present invention, the transition metal compound has an ansa-metallocene structure including cyclopentadiene derivative ligands which are connected with each other by a silicon or alkenylene bridge group, and an indenyl derivative ligand in which aryl is surely substituted at position 4, as represented by chemical formula 1.

As described above, the transition metal compound has an indene derivative ligand in which aryl is substituted at position 4, and has excellent catalyst activity and copolymerization degree when compared with a transition metal compound having a ligand in which an aryl group is unsubstituted at position 4 of indene.

Here, the transition metal compound according to the present invention preferably has the structure of chemical formula 1 wherein at least one or more, preferably, two or more among $R^1$, $R^2$, $R^3$ and $R^4$ are hydrogen, and the rest thereof may be each independently substituted with $(C_1-C_{20})$alkyl, $(C_2-C_{20})$alkenyl, $(C_6-C_{20})$aryl, or $(C_1-C_{20})$ silyl including or not including acetal, ketal or an ether group; and two or more among $R^1$, $R^2$, $R^3$ and $R^4$ may be connected with each other to form an aliphatic ring or an aromatic ring, and more preferably, in a case where at least one or more, preferably, two or more among $R^1$, $R^2$, $R^3$ and $R^4$ are hydrogen, and the rest thereof are each independently substituted with $(C_1-C_{20})$alkyl, the production of a polyolefin having excellent activity during polymerizing an olefin using propylene or ethylene as a monomer and having a high molecular weight, is possible.

Meanwhile, in order that the transition metal compound of chemical formula 1 becomes an active catalyst component used for polymerizing an olefin, compounds represented by chemical formulae 2 to 4 below, which may extract a ligand from the transition metal compound to cationize the central metal so as to act as a counterion having a weak bonding force, i.e., anion, act together as co-catalysts.

Accordingly, the present invention discloses a transition metal catalyst composition: including the transition metal compound; and one or more co-catalyst compounds selected from the group consisting of an aluminum compound represented by chemical formula 2 below, an alkyl metal compound represented by chemical formula 3 below, and a boron compound represented by chemical formula 4 below.

—[Al($R^{17}$)—O]$n$-    [Chemical formula 2]

In chemical formula 2, $R^{17}$ is a halogen radical, or a hydrocarbyl radical of 1 to 20 carbon atoms, which is substituted or unsubstituted with halogen; and n is an integer of 2 or more.

$$A(R^{18})_3 \qquad \text{[Chemical formula 3]}$$

In chemical formula 3, A is aluminum or boron; $R^{18}$ groups are the same or different, and are each independently a halogen radical, or a hydrocarbyl radical of 1 to 20 carbon atoms, which is substituted or unsubstituted with halogen.

$$[L\text{-}H]^+[Z(B)_4]^- \text{ or } [L]^+[Z(B)_4]^- \qquad \text{[Chemical formula 4]}$$

In chemical formula 4, L is a neutral or cationic Lewis acid; H is a hydrogen atom;

Z is an element of group 13; B is each independently an aryl or alkyl radical of 6 to 20 carbon atoms, of which one or more hydrogen atoms are substituted with halogen, hydrocarbyl of 1 to 20 carbon atoms, alkoxy or a phenoxy radicals.

The compound represented by chemical formula 2 is not specifically limited as long as it is an alkylaluminoxane, but preferred examples include methylaluminoxane, ethylaluminoxane, isobutylaluminoxane, butylaluminoxane, etc. so that the co-catalyst compound shows excellent activation effect, and particularly preferable compound is the methylaluminoxane.

The alkyl metal compound represented by chemical formula 3 is not specifically limited, but preferred examples include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc. Particularly preferred compounds may be selected from trimethylaluminum, triethylaluminum and triisobutylaluminum.

In addition, in the co-catalyst compound represented by chemical formula 4, it is preferable if $[L\text{-}H]^+$ is a dimethylanilinium cation, and $[Z(A)_4]^-$ is $[B(C_6F_5)_4]^-$, and it is preferable if $[L]^+$ is $[(C_6H_5)3C]+$, and $[Z(A)_4]^-$ is $[B(C_6F_5)_4]^-$. Here, the co-catalyst compound represented by chemical formula 4 is not specifically limited but nonlimiting examples include triethylammoniumtetraphenylborate, tributylammoniumtetraphenylborate, trimethylammoniumtetraphenylborate, tripropylammoniumtetraphenylborate, trimethylammoniumtetra(p-tolyl)borate, tripropylammoniumtetra(p-tolyl)borate, trimethylammoniumtetra(o,p-dimethylphenyl)borate, triethylammoniumtetra(o,p-dimethylphenyl)borate, tributylammoniumtetra(p-trifluoromethylphenyl)borate, trimethylammoniumtetra(p-trifluoromethylphenyl)borate, tributylammoniumtetrapentafluorophenylborate, N,N-diethylamylidiumtetraphenylborate, N,N-diethylaniliniumtetraphenylborate, N,N-diethylaniliniumtetrapentafluorophenylborate, diethylammoniumtetrapentafluorophenylborate, triphenylphosphoniumtetraphenylborate, trimethylphosphoniumtetraphenylborate, triphenylcarboniumtetra(p-trifluoromethylphenyl)borate, triphenylcarboniumtetrapentafluorophenylborate, dimethylaniliniumtetrakis(pentafluorophenyl)borate, etc.

A catalyst composition may be prepared using the compounds of chemical formula 1 to chemical formula 4 and used for polymerizing an olefin, and as a method for preparing a catalyst composition, a method illustrated below may be used.

First, if Q1 and Q2 of the transition metal compound represented by chemical formula 1 are halogen, a method of contacting the compound represented by chemical formula 2 is used. Second, if Q1 and Q2 of chemical formula 1 are alkyl radicals, a catalyst composition may be prepared by contacting the transition metal compound with the compound represented by chemical formula 3 or 4, or a catalyst composition may be prepared by separately directly injecting into a polymerization reactor.

The amount added of the co-catalyst compound may be determined by considering the amount added of the transition metal compound represented by chemical formula 1 and an amount required for sufficiently activating the co-catalyst compound. The amount of the co-catalyst compound may be 1:1-100,000, preferably, 1:1-10,000, more preferably, 1:1-5,000 based on the molar ratio of a metal contained in the co-catalyst compound with respect to 1 mol of a transition metal contained in the transition metal compound represented by chemical formula 1.

More particularly, in case of the first method, the compound represented by chemical formula 2 may be included in a molar ratio of 1:10-5,000, more preferably, in a molar ratio of 1:50-1,000, most preferably, in a molar ratio of 1:100-1,000 with respect to the transition metal compound represented by chemical formula 1. If the molar ratio of the compound represented by chemical formula 2 with respect to the transition metal compound of chemical formula 1 is less than 1:10, the amount of aluminoxane is very small, and the activation of a metal compound may incompletely carried out, and if the amount is greater than 1:5,000, an excessive amount of aluminoxane acts as a catalyst poison, and the aluminoxane may inhibit a polymer chain from growing well.

In addition, in case of the second method, if A in the co-catalyst composition represented by chemical formula 3 is boron, the compound represented by chemical formula 3 may be supported in a molar ratio of 1:1-100, preferably, 1:1-10, more preferably, 1:1-3 with respect to the transition metal compound represented by chemical formula 1. Also, if A in the co-catalyst compound represented by chemical formula 3 is aluminum, the compound represented by chemical formula 3 may be supported in a molar ratio of 1:1-1000, preferably, 1:1-500, more preferably, 1:1-100 with respect to the transition metal compound represented by chemical formula 1, even though the molar ratio may be changed according to the amount of water in a polymerization system.

In addition, the co-catalyst compound represented by chemical formula 4 may be supported in a molar ratio of 1:0.5-30, preferably, 1:0.7-20, more preferably, 1:1-10 with respect to the transition metal compound represented by chemical formula 1. If the ratio of the co-catalyst compound represented by chemical formula 4 is less than 1:0.5, the amount of an activating agent is relatively small, and the activation of a metal compound may be incompletely carried out, and thus, the activity of a catalyst composition thus produced may be degraded. If the molar ratio is greater than 1:30, the activation of a metal compound may be completely carried out, but due to the remaining excessive amount of activating agent, the unit cost of the catalyst composition may not be economically feasible or the purity of a polymer produced may be degraded.

Meanwhile, the catalyst according to the present invention may further include a supporter in the compound represented by chemical formula 1 and the co-catalyst compound.

The supporter may be any supporters of an inorganic or organic material used for the preparation of a catalyst in a technical field of the present invention, without limitation, for example, $SiO_2$, $Al_2O_3$, MgO, $MgCl_2$, $CaCl_2$, $ZrO_2$, $TiO_2$, $B_2O_3$, CaO, ZnO, BaO, $ThO_2$, $SiO_2$—$Al_2O_3$, $SiO_2$—MgO, $SiO_2$—$TiO_2$, $SiO_2$—$V_2O_5$, $SiO_2$—$CrO_2O_3$, $SiO_2$—$TiO_2$—MgO, bauxite, zeolite, starch, cyclodextrine, a synthetic polymer, etc. may be used. Preferably, the supporter may include a hydroxyl group at the surface thereof, and may be one or more supporters selected from the group consisting of silica, silica-alumina and silica-magnesia.

As the method for supporting the transition metal compound and the co-catalyst in the supporter, a method of directly supporting the transition metal compound in a dehydrated supporter, a method of supporting the transition metal compound after pre-treating the supporter with the co-catalyst compound, a method of supporting the transition metal compound in the supporter and then post-treating with the co-catalyst compound, a method of reacting the transition metal compound with the co-catalyst compound and then adding a supporter to carry out the reaction, etc. may be used.

Solvents used in the supporting methods may be aliphatic hydrocarbon-based solvents, aromatic hydrocarbon-based solvents, halogenated aliphatic hydrocarbon-based solvents, or a mixture thereof. Here, nonlimiting examples of the aliphatic hydrocarbon-based solvent may include pentane, hexane, heptane, octane, nonane, decane, undecane, dodecane, etc. In addition, nonlimiting examples of the aromatic hydrocarbon-based solvent may include benzene, monochlorobenzene, dichlorobenzene, trichlorobenzene, toluene, etc. In addition, nonlimiting examples of the halogenated aliphatic hydrocarbon-based solvent may include dichloromethane, trichloromethane, dichloroethane, trichloroethane, etc.

In addition, a process for supporting the transition metal compound and the co-catalyst compound in a supporter may be carried out at a temperature of −70-200° C., preferably, −50-150° C., more preferably, 0-100° C. considering the efficiency of a supporting process.

According to an embodiment of the present invention, in a copolymer produced through a polymerization process performed by directly contacting a propylene or ethylene compound, a catalyst portion is relatively insoluble and/or fixable, and a polymer chain may be prepared by propylene or ethylene polymerization under rapidly fixing conditions by the information thereof. Such fixation may be performed by, for example, using a solid insoluble catalyst, generally performing copolymerization in an insoluble medium for the copolymer thus prepared, and keeping a polymerization reactant and product to less than or equal to the crystal melting point of a copolymer.

The above-described metallocene catalyst composition is preferable for the copolymerization of propylene or ethylene. Accordingly, the present invention discloses a method for preparing a polyolefin, including a step of polymerizing propylene or ethylene in the presence of the transition metal catalyst composition. That is, the method for preparing a polyolefin according to the present invention is performed by including a step of polymerizing a propylene or ethylene compound in the presence of a transition metal catalyst composition including the transition metal compound represented by chemical formula 1, and one or more co-catalyst compounds selected from the group consisting of the aluminum compound represented by chemical formula 2, the alkyl metal compound represented by chemical formula 3 and the boron compound represented by chemical formula 4.

A suitable polymerization process is well-known to persons skilled in the art, and includes bulk polymerization, solution polymerization, slurry polymerization and low-pressure vapor polymerization. The metallocene catalyst composition is particularly useful in a well-known operation type using a fixed bed, a moving bed or a slurry process, which are performed in a single, series or parallel reactor.

In case where the polymerization reaction is performed in a liquid phase or a slurry phase, a solvent or a propylene or ethylene monomer itself may be used as a medium.

Since the catalyst composition suggested in the present invention is present in a uniform type in a polymerization reactor, the catalyst composition is preferably applied in a solution polymerization process which is performed at a temperature of the melting point of the polymer or more. However, as disclosed in U.S. Pat. No. 4,752,597, a non-uniform catalyst composition type which is obtained by supporting a transition metal catalyst and a co-catalyst in a porous metal oxide supporter may be used in a slurry polymerization or vapor polymerization process. Accordingly, if the catalyst composition of the present invention is used together with an inorganic supporter or an organic polymer supporter, it may be applied in a slurry or vapor phase process. That is, the transition metal compound and the co-catalyst compound may be used as a supported type in an inorganic supporter or an organic polymer supporter.

Solvents used during polymerization reaction may be aliphatic hydrocarbon-based solvents, aromatic hydrocarbon-based solvents, halogenated aliphatic hydrocarbon-based solvents or a mixture thereof. Here, nonlimiting examples of the aliphatic hydrocarbon-based solvent may include butane, isobutane, pentane, hexane, heptane, octane, nonane, decane, undecane, dodecane, cyclopentane, methylcyclopentane, cyclohexane, etc. In addition, nonlimiting examples of the aromatic hydrocarbon-based solvent may include benzene, monochlorobenzene, dichlorobenzene, trichlorobenzene, toluene, xylene, chlorobenzene, etc. In addition, nonlimiting examples of the halogenated aliphatic hydrocarbon-based solvent may include dichloromethane, trichloromethane, chloroethane, dichloroethane, trichloroethane, 1,2-dichloroethane, etc.

According to an embodiment of the present invention, a method for preparing a polypropylene resin may be carried out by polymerizing a propylene and ethylene compound in the presence of the transition metal catalyst composition. In this case, the transition metal catalyst and the co-catalyst components may be separately injected into a reactor, or each component may be mixed in advance and then injected to the reactor. Mixing conditions such as injection order, temperature and concentration are not specifically limited. In this case, the ethylene may be included in an amount of 0.01-10 wt %, preferably, 0.1-8 wt %, more preferably, 0.5-5 wt %. If the amount deviates from the range, catalyst activity may be degraded, or fouling phenomenon may be induced in a process.

Meanwhile, in the polymerization reaction of the present invention, the amount added of the catalyst may be determined in a range where the polymerization reaction of a monomer may be sufficiently carried out according to a slurry phase, liquid phase, vapor phase or bulk phase process, and is not specifically limited. However, the amount added of the catalyst is preferably $10^{-8}$ to 1 mol/L, more preferably, $10^{-7}$ to $10^{-1}$ mol/L, further more preferably, $10^{-7}$ to $10^{-2}$ mol/L, based on the concentration of a central metal (M) in a main catalyst compound (transition metal compound) per unit volume (L) of the monomer.

In addition, the polymerization reaction of the present invention is performed by a batch type, a semi-continuous type or a continuous type reaction, preferably, a continuous type reaction.

The temperature and pressure conditions of the polymerization reaction of the present invention may be determined by considering the efficiency of the polymerization according to the kind of the reaction and the kind of the reactor, but the polymerization temperature may be 40-150° C., preferably, 60-100° C., and the pressure may be 1-100 atm, preferably, 5-50 atm.

The polyolefin prepared according to the present invention may increase the polymerization activity of a propylene and ethylene monomer and show a high molecular weight by using a catalyst including a main catalyst compound and a co-catalyst compound.

In this case, the polyolefin may have a weight average molecular weight (Mw) of 10,000-1,000,000, preferably, 100,000-800,000, more preferably, 300,000-700,000.

In addition, the polyolefin may have molecular weight distribution (Mw/Mn) of 1-15, preferably, 1.5-10, more preferably, 1.5-5.

In addition, the above-described metallocene catalyst composition is preferable for the random copolymerization of propylene and ethylene. Accordingly, the present invention provides a method for preparing an ethylene-propylene random copolymer by using the above-described metallocene catalyst composition. That is, a method for preparing an ethylene-propylene random copolymer, including a step of polymerizing propylene and ethylene in the presence of the transition metal catalyst composition is disclosed.

The method for preparing an ethylene-propylene random copolymer according to the present invention is performed by including a step of random copolymerizing propylene and ethylene compounds in the presence of a transition metal catalyst composition including the transition metal compound represented by chemical formula 1, and one or more co-catalyst compounds selected from the group consisting of the aluminum compound represented by chemical formula 2, the alkyl metal compound represented by chemical formula 3 and the boron compound represented by chemical formula 4.

In this case, the polymerization reaction may be performed by adding the ethylene in 0.5 to 5 parts by weight, preferably, 0.5 to 4 parts by weight, more preferably, 0.5 to 3 parts by weight, most preferably, 1 to 3 parts by weight with respect to 100 parts by weight of propylene. If the ethylene added in the polymerization reaction is less than 0.5 parts by weight, the melt index of a finally prepared ethylene-propylene random copolymer is excessively low, and injecting properties may become problematic, and defects of degrading transparency and decrease of catalyst activity may occur, and if the amount of the ethylene is greater than 5 parts by weight, a molecular weight is decreased, the melt index may be excessively high or the activity of a catalyst may decrease. Other particular polymerization conditions are the same as described above.

The ethylene-propylene random copolymer prepared according to the method of the present invention uses a catalyst including a main catalyst compound and a co-catalyst compound, and the polymerization activity of propylene and ethylene is high and a high molecular weight and excellent transparency may be achieved.

In this case, in the ethylene-propylene random copolymer, the ethylene syndiotactic index may be 0.91 or more, preferably, 0.93 or more, most preferably, 0.94 or more.

In addition, the melting point (Tm) of the ethylene-propylene random copolymer may be 147° C. or less, preferably, 143° C. or less.

In addition, the weight average molecular weight (Mw) of the ethylene-propylene random copolymer may be 200,000-1,000,000, preferably, 300,000-800,000, more preferably, 500,000-700,000, most preferably, 550,000-600,000.

In addition, the ethylene-propylene random copolymer may have molecular weight distribution (Mw/Mn, MWD) of 2.0-5.0 g/10 min, preferably, 2.0-4.0 g/10 min, more preferably, 2.4-2.7 g/10 min, most preferably, 2.5-2.6 g/10 min.

In addition, the haze of the ethylene-propylene random copolymer may be 10-25, preferably, 10-23, more preferably, 13-23, most preferably, 15-21.

In addition, the melt index (230° C., 2.16 kg load, Melt Index, MI) of the ethylene-propylene random copolymer may be 0.5-10 g/10 min, preferably, 1.0-2.5 g/10 min, more preferably, 1.0-1.5 g/10 min, most preferably, 1.2-1.4 g/10 min.

Hereinafter, preferred embodiments according to the present invention will be explained.

Unless otherwise separately referred to, all synthetic experiments of ligands and catalysts were performed in a nitrogen atmosphere using a standard Schlenk or glove box technique, organic solvents used in all reactions were used after removing moisture by refluxing in a sodium metal and benzophenone and by distilling immediately before the use. 1H-NMR analysis of the ligands and catalysts thus synthesized was performed at room temperature using Bruker 300 MHz.

A polymerization solvent, n-hexane was used after passing through a column filled with 5A molecular sieves and active alumina, bubbling with high purity nitrogen to sufficiency remove moisture, oxygen and other catalyst poison materials. All polymerization reactions were performed in a high pressure autoclave which was completely blocked from exterior air after injecting a solvent, a co-catalyst, each monomer for polymerization, etc. in amounts required, and putting a catalyst. The polymers thus prepared were analyzed by the methods below.

(1) Melt Index (MI)

According to ASTM D 1238, after heating to 230° C., a piston of 2.16 kg was put on a proper position in a cylinder, and an amount of a resin passed through an orifice (inner diameter: 2.09 mm, length: 8 mm) for a certain time (minute unit) was measured and converted into a passing amount for 10 minutes.

(2) Weight Average Molecular Weight (Mw) and Molecular Weight Distribution (MWD)

Measurement was performed using PL210 GPC equipped with PL Mixed-BX2+preCol at 135° C. in a rate of 1.0 ml/min in a 1,2,3-trichlorobenzene solvent, and a molecular weight was calibrated using a PL polystyrene standard material.

(3) Melting Point (Tm) Analysis

Measurement was performed using Dupont DSC2910 under a nitrogen atmosphere in a rate of 10° C./min in 2nd heating conditions.

(4) Ethylene Content Analysis

Analysis was performed through 13C-NMR analysis using Bruker 300 MHz.

(5) Syndiotactic Index

Through 13C-NMR analysis using Bruker 300 MHz, EEE (A), EEP (B), EPE (C), PPE (D), PEP (E), and PPP (F) contents were quantified.

$$\text{Syndiotactic index} = (B+C+D+E-A)/(1-F)$$

(6) Haze Measurement

According to ASTM D1003, a haze value of a specimen with a thickness of 3T was measured using a Haze meter.

Catalyst Preparation Example 1

Synthesis of Transition Metal Compound (4-butyl-2-methylcyclopentadienyl dimethylsilyl 2-methyl-4-(4-tert-butylphenyl)indenyl Zr dichloride)

1) Synthesis of dimethyl 4-butyl-2-methylcyclopentadienyl chlorosilane

To a 2 L flask, tetrahydrofuran (600 ml) and 1-butyl-3-methylcyclopentadiene (50 g) were added, and under a nitrogen atmosphere at −10° C., n-BuLi (2.5 M hexane solution) (170 ml) was slowly added thereto dropwise and then stirred and reacted at room temperature for 12 hours. The temperature of the reaction solution was decreased to −10° C. again, and dimethyl dichlorosilane (170 g) was added, followed by stirring and reacting at room temperature for 12 hours. Then, the reaction product was vacuum dried. n-hexane (500 ml) was injected thereto for dissolving the reaction product, and filtering was performed using a celite filter. The filtrate was dried in vacuum to obtain 70 g of dimethyl 4-butyl-2-methylcyclopentadienyl chlorosilane as a yellow oil type (yield 70%).

2) Synthesis of dimethyl 4-butyl-2-methylcyclopentadienyl 2-methyl-4-(4-tert-butylphenyl)indenyl silane A flask to which toluene (200 ml), tetrahydrofuran (40 ml) and 2-methyl-4-(4-tert-butylphenyl)indene (50 g) were injected, was cooled to −10° C., and n-BuLi (2.5 M hexane solution (76 ml) was slowly added thereto dropwisely, followed by stirring at room temperature for 12 hours. The temperature of the reaction solution was decreased to −10° C. again, and dimethyl 4-butyl-2-methylcyclopentadienyl chlorosilane (38 g) was injected, followed by stirring and reacting at room temperature for 12 hours. After finishing the reaction, water (400 ml) was injected and stirred at room temperature for 1.5 hours. The resultant product was extracted with toluene and dried in vacuum to obtain 80 g of dimethyl 4-butyl-2-methylcyclopentadienyl 2-methyl-4-(4-tert-butylphenyl)indenyl silane as a yellow oil type (yield 95%).

3) Synthesis of 4-butyl-2-methylcyclopentadienyl dimethylsilyl 2-methyl-4-(4-tert-butylphenyl)indenyl Zr dichloride Dimethyl 4-butyl-2-methylcyclopentadienyl 2-methyl-4-(4-tert-butylphenyl)indenyl silane (50 g), toluene (300 ml) and diethyl ether (100 ml) were added to a flask and cooled to −10° C. Then, n-BuLi (2.5 M hexane solution) (90 ml) was slowly added thereto dropwisely. After finishing the dropwise addition, the reaction temperature was elevated to room temperature, and stirring for 48 hours and filtering were performed. The filtrate thus obtained was dried in vacuum to obtain 40 g of a 4-butyl-2-methylcyclopentadienyl dimethylsilyl 2-methyl-4-(4-tert-butylphenyl)indenyl dilithium salt as a solid type (yield 80%), and this product was used in a subsequent reaction without separation.

The 4-butyl-2-methylcyclopentadienyl dimethylsilyl 2-methyl-4-(4-tert-butylphenyl)indenyl dilithium salt (40 g), toluene (40 ml) and ether (10 ml) were put in flask #1 and stirred. In flask #2, a mixture solution of toluene (30 ml) and ZrCl4 (20 g) was prepared. The mixture solution in flask #2 was slowly added to flask #1 dropwisely using a cannular, and stirring was performed at room temperature for 24 hours. After finishing the stirring, the resultant product was dried in vacuum, extracted with methylene chloride (500 ml) and filtered using a celite filter. The filtrate thus obtained was dried in vacuum. The solid thus obtained was washed using a 1:3 mixture solution (50 ml) of methylene chloride and n-hexane and dried in vacuum to obtain 32 g of 4-butyl-2-methylcyclopentadienyl dimethylsilyl 2-methyl-4-(4-tert-butylphenyl)indenyl Zr dichloride as a yellow solid type (yield 60%).

Preparation of Supported Catalyst

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added thereto dropwisely at 10° C., followed by stirring at 0° C. for about 1 hour, and then, the temperature was elevated to 70° C., and stirring was performed for 3 hours, and the temperature was decreased to 25° C. Separately, the transition metal compound (0.060 g, 100 μmol) synthesized in the glove box was put in another 100 ml Schlenk flask and this flask was taken out from the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was decreased to 25° C., and stirring was performed for about 24 hours. After that, the resultant product of the reaction was dried in vacuum to obtain 2.70 g of a free flowing supported catalyst.

Catalyst Preparation Example 2

Synthesis of transition metal compound (2,4-dimethylcyclopentadienyl dimethylsilyl 2-methyl-4-(4-tert-butylphenyl)indenyl Zr dichloride)

1) Synthesis of dimethyl 2,4-dimethylcyclopentadienyl chlorosilane

To a 2 L flask, tetrahydrofuran (600 ml) and 1,3-dimethylcyclopentadiene (50 g) were added, and under a nitrogen atmosphere at −10° C., n-BuLi (2.5 M hexane solution) (170 ml) was slowed added thereto dropwisely and then stirred and reacted at room temperature for 12 hours. The temperature of the reaction solution was decreased to −10° C. again, and dimethyl dichlorosilane (170 g) was added, followed by stirring and reacting at room temperature for 12 hours. Then, the reaction product was dried in vacuum. n-hexane (500 ml) was injected thereto for dissolving the reaction product, and filtering was performed using a celite filter. The filtrate was dried in vacuum to obtain 70 g of dimethyl 2,4-dimethylcyclopentadienyl chlorosilane as a yellow oil type (yield 70%).

2) Synthesis of dimethyl 2,4-dimethylcyclopentadienyl 2-methyl-4-(4-tert-butylphenyl)indenyl silane A flask to which toluene (200 ml), tetrahydrofuran (40 ml) and 2-methyl-4-(4-tert-butylphenyl)indene (50 g) were injected, was cooled to −10° C., and n-BuLi (2.5 M hexane solution) (76 ml) was slowly added thereto dropwisely, followed by stirring at room temperature for 12 hours. The temperature of the reaction solution was decreased to −10° C. again, and dimethyl 2,4-dimethylcyclopentadienyl chlorosilane (38 g) was injected, followed by stirring and reacting at room temperature for 12 hours. After finishing the reaction, water (400 ml) was injected and stirring was performed at room temperature for 1.5 hours. The resultant product was extracted with toluene and dried in vacuum to obtain 80 g of dimethyl 2,4-dimethylcyclopentadienyl 2-methyl-4-(4-tert-butylphenyl)indenyl silane as a yellow oil type (yield 95%).

3) Synthesis of 2,4-dimethylcyclopentadienyl dimethylsilyl 2-methyl-4-(4-tert-butylphenyl)indenyl Zr dichloride Dimethyl 2,4-dimethylcyclopentadienyl 2-methyl-4-(4-tert-butylphenyl)indenyl silane (50 g), toluene (300 ml) and diethyl ether (100 ml) were added to a flask and cooled to −10° C. Then, n-BuLi (2.5 M hexane solution) (90 ml) was slowly added thereto dropwisely. After finishing the dropwise addition, the reaction temperature was elevated to room temperature, and stirring for 48 hours and filtering were performed. The filtrate thus obtained was dried in vacuum to obtain 40 g of a 2,4-dimethylcyclopentadienyl dimethylsilyl 2-methyl-4-(4-tert-butylphenyl)indenyl dilithium salt as a solid type (yield 80%), and this product was used in a subsequent reaction without separation.

The 2,4-dimethylcyclopentadienyl dimethylsilyl 2-methyl-4-(4-tert-butylphenyl)indenyl dilithium salt (40 g), toluene (40 ml) and ether (10 ml) were put in flask #1 and stirred. In flask #2, a mixture solution of toluene (30 ml) and ZrCl$_4$ (20 g) was prepared. The mixture solution in flask #2 was slowly added to flask #1 dropwisely using a cannular, and stirring was performed at room temperature for 24 hours. After finishing the stirring, the resultant product was dried in vacuum, extracted with methylene chloride (500 ml) and filtered using a celite filter. The filtrate thus obtained was dried in vacuum. The solid thus obtained was washed using a 1:3 mixture solution (50 ml) of methylene chloride and n-hexane and dried in vacuum to obtain 32 g of 2,4-dimethylcyclopentadienyl dimethylsilyl 2-methyl-4-(4-tert-butylphenyl)indenyl Zr dichloride as a yellow solid type (yield 60%).

Preparation of Supported Catalyst

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added thereto dropwisely at 10° C., followed by stirring at 0° C. for about 1 hour, and then, the temperature was elevated to 70° C., and stirring was performed for 3 hours, and the temperature was decreased to 25° C. Separately, the transition metal compound (0.060 g, 100 µmol) synthesized in a glove box was put in another 100 ml Schlenk flask, and this flask was taken out from the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was decreased to 25° C., and stirring was performed for about 24 hours. After that, the resultant product of the reaction was dried in vacuum to obtain 2.70 g of a free flowing supported catalyst.

Catalyst Preparation Example 3

Synthesis of transition metal compound (tetramethylcyclopentadienyl dimethylsilyl 2-methyl-4-(4-tert-butylphenyl)indenyl Zr dichloride)

1) Synthesis of dimethyl tetramethylcyclopentadienyl chlorosilane

To a 2 L flask, tetrahydrofuran (600 ml) and tetramethylcyclopentadiene (50 g) were added, and under a nitrogen atmosphere at −10° C., n-BuLi (2.5 M hexane solution) (170 ml) was slowed added thereto dropwisely and then stirred and reacted at room temperature for 12 hours. The temperature of the reaction solution was decreased to −10° C. again, and dimethyl dichlorosilane (170 g) was added, followed by stirring and reacting at room temperature for 12 hours. Then, the reaction product was dried in vacuum. n-hexane (500 ml) was injected thereto for dissolving the reaction product, and filtering was performed using a celite filter. The filtrate was dried in vacuum to obtain 70 g of dimethyl tetramethylcyclopentadienyl chlorosilane as a yellow oil type (yield 80%).

2) Synthesis of dimethyl tetramethylcyclopentadienyl 2-methyl-4-(4-tert-butylphenyl)indenyl silane A flask to which toluene (200 ml), tetrahydrofuran (40 ml) and 2-methyl-4-(4-tert-butylphenyl)indene (50 g) were injected, was cooled to −10° C., and n-BuLi (2.5 M hexane solution) (76 ml) was slowly added thereto dropwisely, followed by stirring at room temperature for 12 hours. The temperature of the reaction solution was decreased to −10° C. again, and dimethyl tetramethylcyclopentadienyl chlorosilane (38 g) was injected, followed by stirring and reacting at room temperature for 12 hours. After finishing the reaction, water (400 ml) was injected and stirring was performed at room temperature for 1.5 hours. The resultant product was extracted with toluene and dried in vacuum to obtain 80 g of dimethyl tetramethylcyclopentadienyl 2-methyl-4-(4-tert-butylphenyl)indenyl silane as a yellow oil type (yield 95%).

3) Synthesis of tetramethylcyclopentadienyl dimethylsilyl 2-methyl-4-(4-tert-butylphenyl)indenyl Zr dichloride Dimethyl tetramethylcyclopentadienyl 2-methyl-4-(4-tert-butylphenyl)indenyl silane (50 g), toluene (300 ml) and diethyl ether (100 ml) were added to a flask and cooled to −10° C. Then, n-BuLi (2.5 M hexane solution) (90 ml) was slowly added thereto dropwisely. After finishing the dropwise addition, the reaction temperature was elevated to room temperature, and stirring for 48 hours and filtering were performed. The filtrate thus obtained was dried in vacuum to obtain 40 g of a tetramethylcyclopentadienyl dimethylsilyl 2-methyl-4-(4-tert-butylphenyl)indenyl dilithium salt as a solid type (yield 80%), and this product was used in a subsequent reaction without separation.

The tetramethylcyclopentadienyl dimethylsilyl 2-methyl-4-(4-tert-butylphenyl)indenyl dilithium salt (40 g), toluene (40 ml) and ether (10 ml) were put in flask #1 and stirred. In flask #2, a mixture solution of toluene (30 ml) and ZrCl4 (20 g) was prepared. The mixture solution in flask #2 was slowly added to flask #1 dropwisely using a cannular, and stirring was performed at room temperature for 24 hours. After finishing the stirring, the resultant product was dried in vacuum, extracted with methylene chloride (500 ml) and filtered using a celite filter. The filtrate thus obtained was dried in vacuum. The solid thus obtained was washed using a 1:3 mixture solution (50 ml) of methylene chloride and n-hexane and dried in vacuum to obtain 32 g of tetramethylcyclopentadienyl dimethylsilyl 2-methyl-4-(4-tert-butylphenyl)indenyl Zr dichloride as a yellow solid type (yield 60%).

Preparation of Supported Catalyst

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added thereto dropwisely at 10° C., followed by stirring at 0° C. for about 1 hour, and then, the temperature was elevated to 70° C., and stirring was performed for 3 hours, and the temperature was decreased to 25° C. Separately, the transition metal compound (0.060 g, 100 μmol) synthesized in a glove box was put in another 100 ml Schlenk flask, and this flask was taken out from the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was decreased to 25° C., and stirring was performed for about 24 hours. After that, the resultant product of the reaction was dried in vacuum to obtain 2.70 g of a free flowing supported catalyst.

Example 1

At room temperature, the inside of a stainless steel autoclave with an internal volume of 2 L was completely substituted with nitrogen. While keeping nitrogen purging, triisobutylaluminum (2 ml of 1 M solution in hexane) and 500 g of propylene were injected. 50 mg of the supported catalyst compound prepared in Catalyst Preparation Example 1 was dispersed in 5 ml of hexane and injected into a reactor using high pressure nitrogen. Then, polymerization was performed at 70° C. for 60 minutes. After finishing the polymerization, the reactor was cooled to room temperature, and an excessive amount of propylene was removed through a discharge line to obtain a white powder solid. The white solid powder thus obtained was dried by heating at 80° C. for 15 hours or more using a vacuum oven to prepare a final polypropylene resin.

Example 2

At room temperature, the inside of a stainless steel autoclave with an internal volume of 2 L was completely substituted with nitrogen. While keeping nitrogen purging, triisobutylaluminum (2 ml of 1 M solution in hexane) and 500 g of propylene were injected, and 10 ppm of hydrogen was injected via MFC. Then, 50 mg of the supported catalyst compound prepared in Catalyst Preparation Example 1 was dispersed in 5 ml of hexane and injected into a reactor using high pressure nitrogen. Then, polymerization was performed at 70° C. for 60 minutes. After finishing the polymerization, the reactor was cooled to room temperature, and an excessive amount of propylene was removed through a discharge line to obtain a white powder solid. The white solid powder thus obtained was dried by heating at 80° C. for 15 hours or more using a vacuum oven to prepare a final polypropylene resin.

Example 3

A polypropylene resin was prepared by the same method as in Example 2 except for injecting 60 ppm of hydrogen via MFC in Example 2.

Example 4

A polypropylene resin was prepared by the same method as in Example 1 except for using the supported catalyst compound prepared in Catalyst Preparation Example 2 in Example 1.

Example 5

A polypropylene resin was prepared by the same method as in Example 2 except for using the supported catalyst compound prepared in Catalyst Preparation Example 2 in Example 2.

Example 6

A polypropylene resin was prepared by the same method as in Example 3 except for using the supported catalyst compound prepared in Catalyst Preparation Example 2 in Example 3.

Example 7

A polypropylene resin was prepared by the same method as in Example 1 except for using the supported catalyst compound prepared in Catalyst Preparation Example 3 in Example 1.

Example 8

A polypropylene resin was prepared by the same method as in Example 2 except for using the supported catalyst compound prepared in Catalyst Preparation Example 3 in Example 2.

Example 9

A polypropylene resin was prepared by the same method as in Example 3 except for using the supported catalyst compound prepared in Catalyst Preparation Example 3 in Example 3.

Physical properties were measured for the polymers prepared according to the examples, and the results are listed in Table 1 below.

TABLE 1

| Division | H2 (ppm) | Activity (kg/cat-g) | Tm (° C.) | MI (g/10 min) | Mw | MWD |
|---|---|---|---|---|---|---|
| Example 1 | 0 | 23 | 153 | 0.8 | 615,000 | 2.4 |
| Example 2 | 10 | 25 | 152 | 6.1 | 398,000 | 2.6 |
| Example 3 | 60 | 25 | 153 | 40.5 | 188,000 | 2.5 |
| Example 4 | 0 | 19 | 152 | 2.1 | 515,000 | 2.5 |
| Example 5 | 10 | 22 | 152 | 7.1 | 364,000 | 2.5 |
| Example 6 | 60 | 21 | 152 | 45.2 | 175,000 | 2.7 |
| Example 7 | 0 | 17 | 152 | 3.3 | 401,000 | 2.8 |
| Example 8 | 10 | 20 | 152 | 11.8 | 269,000 | 2.8 |
| Example 9 | 60 | 16 | 151 | 60.5 | 144,000 | 2.9 |

Referring to Table 1, it may be found that a polymer having excellent catalyst activity and a high molecular weight may be prepared by preparing a polymer by directly contacting propylene or ethylene using a specific metallocene catalyst system according to the present invention. However, in the polymerization of propylene or ethylene, it may be confirmed that if a catalyst where at least two or more among $R^1$, $R^2$, $R^3$ and $R^4$ in the structure of chemical formula 1 are hydrogen is used (Examples 1 to 6), even more excellent catalyst activity and a high molecular weight may be achieved.

Example 10

At room temperature, the inside of a stainless steel autoclave with an internal volume of 2 L was completely substituted with nitrogen. While keeping nitrogen purging, triisobutylaluminum (2 ml of 1 M solution in hexane), 500 g of propylene (PL) and 2.5 g of ethylene (EL) were injected into the reactor. Then, 50 mg of the supported catalyst compound prepared in Catalyst Preparation Example 1 was dispersed in 5 ml of hexane and injected into the reactor using high pressure nitrogen. Then, polymerization was performed at 70° C. for 60 minutes. After finishing the polymerization, the reactor was cooled to room temperature, and an excessive amount of propylene was removed through a discharge line to obtain a white powder solid. The white solid powder thus obtained was dried by heating at 80° C. for 15 hours or more using a vacuum oven to prepare a final ethylene-propylene random copolymer resin.

Example 11

An ethylene-propylene random copolymer resin was prepared by the same method as in Example 10 except for controlling the ethylene content to 5 g in Example 10.

Example 12

An ethylene-propylene random copolymer resin was prepared by the same method as in Example 10 except for controlling the ethylene content to 10 g in Example 10.

Example 13

An ethylene-propylene random copolymer resin was prepared by the same method as in Example 10 except for controlling the ethylene content to 15 g in Example 10.

Example 14

An ethylene-propylene random copolymer resin was prepared by the same method as in Example 10 except for controlling the ethylene content to 20 g in Example 10.

Example 15

An ethylene-propylene random copolymer resin was prepared by the same method as in Example 10 except for using the supported catalyst prepared in Catalyst Preparation Example 3 as the catalyst compound in Example 10.

Example 16

An ethylene-propylene random copolymer resin was prepared by the same method as in Example 15 except for using the ethylene content of 10 g in Example 15.

Example 17

An ethylene-propylene random copolymer resin was prepared by the same method as in Example 15 except for using the ethylene content of 15 g in Example 15.

Comparative Example 1

An ethylene-propylene random copolymer resin was prepared by the same method as in Example 10 except for using commercially available rac-dimethylsilylbis(2-methylinden-1-yl)zirconium dichloride (BSC-420, Bouder) as the catalyst compound in Example 10.

Comparative Example 2

An ethylene-propylene random copolymer resin was prepared by the same method as in Comparative Example 1 except for using the ethylene content of 10 g in Comparative Example 1.

Comparative Example 3

An ethylene-propylene random copolymer resin was prepared by the same method as in Comparative Example 1 except for using the ethylene content of 15 g in Comparative Example 1.

Physical properties were measured for the polymers prepared according to the examples and the comparative examples, and the results are listed in Table 2 below.

TABLE 2

| | PL (g) | EL (g) | EL content (wt%) | Syndiotactic index | Tm (° C.) | Mw | MWD | MI | Haze | Activity (kg/g Cat. hr) |
|---|---|---|---|---|---|---|---|---|---|---|
| Example 10 | 500 | 2.5 | 0.3 | 0.96 | 145 | 615k | 2.4 | 0.8 | 25 | 24 |
| Example 11 | 500 | 5 | 1.6 | 0.96 | 143 | 597k | 2.6 | 1.2 | 21 | 32 |
| Example 12 | 500 | 10 | 3.1 | 0.95 | 129 | 599k | 2.5 | 1.2 | 19 | 37 |
| Example 13 | 500 | 15 | 4.7 | 0.94 | 120 | 584k | 2.6 | 1.4 | 15 | 33 |
| Example 14 | 500 | 20 | 6.1 | 0.93 | 117 | 493k | 2.9 | 2.1 | 12 | 28 |
| Example 15 | 500 | 5 | 1.4 | 0.93 | 144 | 364k | 2.65 | 6.5 | 23 | 21 |
| Example 16 | 500 | 10 | 2.8 | 0.93 | 131 | 351k | 2.86 | 6.8 | 22 | 23 |

TABLE 2-continued

| | PL (g) | EL (g) | EL content (wt%) | Syndiotactic index | Tm (° C.) | Mw | MWD | MI | Haze | Activity (kg/g Cat. hr) |
|---|---|---|---|---|---|---|---|---|---|---|
| Example 17 | 500 | 15 | 4.3 | 0.91 | 123 | 332k | 2.74 | 7.9 | 19 | 22 |
| Comparative Example 1 | 500 | 5 | 0.5 | 0.93 | 149 | 607k | 3.00 | 1.0 | 30 | 21 |
| Comparative Example 2 | 500 | 10 | 1.1 | 0.93 | 146 | 604k | 2.99 | 1.0 | 28 | 15 |
| Comparative Example 3 | 500 | 15 | 1.6 | 0.92 | 143 | 601k | 2.81 | 1.1 | 24 | 14 |

Referring to Table 2, it may be found that if an ethylene-propylene random copolymer is prepared according to the method of the present invention, an ethylene-propylene random copolymer having very high weight average molecular weight and ethylene syndiotactic index, and improved transparency during injection may be prepared. Particularly, in preparing ethylene-propylene random copolymers, the physical properties of the copolymers of Examples 10 to 14, in which a catalyst having a structure of chemical formula 1 where at least two or more among $R^1$, $R^2$, $R^3$ and $R^4$ were hydrogen was used, were more suitable to the physical properties designed in the present invention when compared with the copolymers of Examples 15 to 17, which used a catalyst in which all $R^1$, $R^2$, $R^3$ and $R^4$ were substituted with alkyl groups.

Hereinbefore, preferred embodiments of the present invention have been explained in detail. The explanation of the present invention is only for illustration, and it could be understood that particular embodiment could be easily changed without changing the technical spirit or essential features of the present invention by one of ordinary skilled in the art.

Accordingly, it should be interpreted that the scope of the present invention is represented by claims hereinafter rather than the detailed explanation, and all changes or modifications derived from the meaning, range and equivalent concept of claims are included in the scope of the present invention.

The invention claimed is:

1. A transition metal compound for preparing a polypropylene represented by the following chemical formula 1:

[Chemical formula 1]

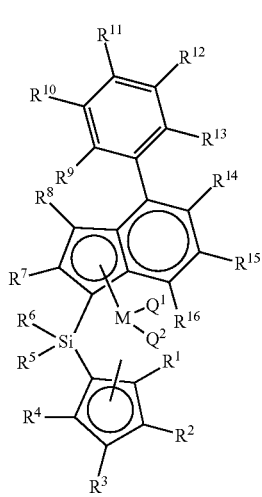

in chemical formula 1,
M is a transition metal of group 4,
$Q^1$ and $Q^2$ are each independently a halogen;
$R^2$ and $R^4$ are hydrogen;
$R^1$ and $R^3$ are each independently $(C_1\text{-}C_{20})$alkyl;
$R^5$, $R^6$, and $R^7$ are methyl;
$R^8$, $R^9$, $R^{10}$, $R^{12}$, $R^{13}$, $R^{14}$, $R^{15}$ and $R^{16}$ are hydrogen; and
$R^{11}$ is tert-butyl.

2. A transition metal catalyst composition, comprising:
the transition metal compound according to claim 1; and
one or more co-catalyst compounds selected from the group consisting of an aluminum compound represented by chemical formula 2 below, an alkyl metal compound represented by chemical formula 3 below and a boron compound represented by chemical formula 4 below:

$$-[Al(R^{17})-O]n- \qquad \text{[Chemical formula 2]}$$

in chemical formula 2, $R^{17}$ is a halogen radical, or a hydrocarbyl radical of 1 to 20 carbon atoms, which is substituted or unsubstituted with halogen; and n is an integer of 2 or more, $$A(R^{18})_3 \qquad \text{[Chemical formula 3]}$$

in chemical formula 3, A is aluminum or boron; $R^{18}$ groups are the same or different, and are each independently a halogen radical, or a hydrocarbyl radical of 1 to 20 carbon atoms, which is substituted or unsubstituted with halogen, $$[\text{L-H}]^+[Z(B)_4]^- \text{ or } [\text{L}]^+[Z(B)_4]^- \qquad \text{[Chemical formula 4]}$$

in chemical formula 4, L is a neutral or cationic Lewis acid; H is a hydrogen atom;
Z is an element of group 13; and B is each independently an aryl or alkyl radical of 6 to 20 carbon atoms, of which one or more hydrogen atoms are substituted with halogen, hydrocarbyl of 1 to 20 carbon atoms, alkoxy or a phenoxy radicals.

3. The transition metal catalyst composition according to claim 2, wherein the aluminum compound co-catalyst is one selected from an alkylaluminoxane or an organic aluminum, or a mixture of two or more thereof, and is a single one selected among methylaluminoxane, modified methylaluminoxane, tetraisobutylaluminoxane, trimethylaluminum, triethylaluminum, triisobutylaluminum and trioctylaluminum, or a mixture of two or more thereof, and the boron compound co-catalyst is a single one selected among tris(pentafluorophenyl)borane, N,N-dimethylanilinium tetrakis(pentafluorophenyl)borate and triphenylmethylinium tetrakis(pentafluorophenyl)borate, or a mixture thereof.

4. A method for preparing a polyolefin, comprising a step of polymerizing propylene or ethylene in the presence of the transition metal catalyst composition of claim 2.

5. A method for preparing an ethylene-propylene random copolymer, comprising a step of polymerizing propylene and ethylene in the presence of the transition metal catalyst composition of claim 2, the ethylene-propylene random copolymer having a syndiotacticity of 0.91 or more, a melting point of 147° C. or less, a weight average molecular weight of 200,000-1,000,000, molecular weight distribution (Mw/Mn) of 2.0-5.0, a melt index (230° C., 2.16 kg load) of 0.5-10.0 g/10 min, and a haze of 10-25.

6. The method for preparing an ethylene-propylene random copolymer according to claim 5, wherein the ethylene is added in 0.5 to 5 parts by weight with respect to 100 parts by weight of the propylene.

\* \* \* \* \*